(12) United States Patent
Ogita et al.

(10) Patent No.: US 9,902,839 B2
(45) Date of Patent: Feb. 27, 2018

(54) CARBON MATERIAL FOR BEARINGS AND SLIDING MEMBER MADE OF CARBON MATERIAL FOR BEARINGS

(71) Applicant: TOYO TANSO CO., LTD., Osaka-shi, Osaka (JP)

(72) Inventors: Yasuhisa Ogita, Kagawa (JP); Motoaki Akiyama, Kagawa (JP)

(73) Assignee: TOYO TANSO CO., LTD., Osaka-shi (JP)

( * ) Notice: Subject to any disclaimer, the term of this patent is extended or adjusted under 35 U.S.C. 154(b) by 158 days.

(21) Appl. No.: 14/781,337

(22) PCT Filed: Mar. 25, 2014

(86) PCT No.: PCT/JP2014/001720
§ 371 (c)(1),
(2) Date: Sep. 30, 2015

(87) PCT Pub. No.: WO2014/162692
PCT Pub. Date: Oct. 9, 2014

(65) Prior Publication Data
US 2016/0032084 A1    Feb. 4, 2016

(30) Foreign Application Priority Data

Apr. 1, 2013    (JP) .................................. 2013-076369

(51) Int. Cl.
*C04B 35/52* (2006.01)
*B60C 1/00* (2006.01)
(Continued)

(52) U.S. Cl.
CPC .............. *C08K 7/24* (2013.01); *C04B 35/532* (2013.01); *C04B 41/009* (2013.01); *C04B 41/48* (2013.01);
(Continued)

(58) Field of Classification Search
None
See application file for complete search history.

(56) References Cited

U.S. PATENT DOCUMENTS

2008/0305319 A1    12/2008    Nishiwaki et al.
2012/0014862 A1    1/2012    Nishiwaki et al.

FOREIGN PATENT DOCUMENTS

JP    5-279005 A    10/1993
JP    8-109083 A    4/1996
(Continued)

OTHER PUBLICATIONS

English translation of International Preliminary Report dated Oct. 1, 2015 issued in counterpart application No. PCT/JP2014/001720 (5 pages).
(Continued)

Primary Examiner — Vishal Vasisth
(74) Attorney, Agent, or Firm — Westerman, Hattori, Daniels & Adrian, LLP

(57) ABSTRACT

A carbon material for bearings includes a porous carbon base material and an impregnation material. The impregnation material is made of resin or metal, and with which the carbon base material is impregnated. The carbon material for bearings includes a plurality of pores. When a pore distribution in the carbon material for bearings is measured by a mercury penetration method using a mercury porosity meter, a cumulative pore volume of pores having a diameter larger than 0.1 μm is not more than 8 mm$^3$/g.

4 Claims, 8 Drawing Sheets

(51) Int. Cl.
- *C08K 3/04* (2006.01)
- *C08K 7/24* (2006.01)
- *F16C 33/16* (2006.01)
- *C04B 35/532* (2006.01)
- *C04B 41/00* (2006.01)
- *C04B 41/83* (2006.01)
- *C04B 41/48* (2006.01)
- *C04B 41/51* (2006.01)
- *C10M 103/02* (2006.01)
- *C04B 41/88* (2006.01)
- *F16C 17/02* (2006.01)
- *F16C 17/04* (2006.01)
- *C04B 111/00* (2006.01)

(52) U.S. Cl.
CPC .............. *C04B 41/51* (2013.01); *C04B 41/83* (2013.01); *C04B 41/88* (2013.01); *C10M 103/02* (2013.01); *F16C 33/16* (2013.01); *C04B 2111/00353* (2013.01); *C04B 2235/616* (2013.01); *F16C 17/02* (2013.01); *F16C 17/04* (2013.01)

(56) References Cited

FOREIGN PATENT DOCUMENTS

| | | |
|---|---|---|
| JP | 10-72266 A | 3/1998 |
| JP | 11-180790 A | 7/1999 |
| JP | 2001-271839 A | 10/2001 |
| JP | 2008-249129 A | 10/2008 |
| JP | 2008-303108 A | 12/2008 |
| JP | 2009-40635 A | 2/2009 |
| JP | 2011-245487 A | 12/2011 |

OTHER PUBLICATIONS

International Search Report dated Jul. 1, 2014, issued in counterpart International Application No. PCT/JP2014/001720 (2 pages).

Office Action dated Jul. 11, 2017, issued in counterpart Japanese Application No. 2015-509895, with English translation (5 pages).

CARBON MATERIAL FOR BEARINGS AND SLIDING MEMBER MADE OF CARBON MATERIAL FOR BEARINGS

This application is a 371 of PCT/JP2014/001720, filed Mar. 25, 2014.

TECHNICAL FIELD

The present invention relates to a carbon material for bearings used for a sliding bearing and a sliding member made of the carbon material for bearings.

BACKGROUND ART

A sliding bearing such as a thrust sliding bearing and a radial sliding bearing includes a sliding member and a mating member that respectively have sliding surfaces. The sliding member and the mating member are held with the sliding surfaces of the sliding member and the mating member being in contact with each other. In this sliding bearing, with a load being exerted on the sliding surface of the mating member from the sliding member, the sliding member slides relative to the mating member. Therefore, a material having a high sliding property is required for the sliding member.

As a material used for the above-mentioned sliding member, a material including carbon that has lubricity is suggested. For example, in Patent Document 1, a carbon sliding material in which opening pores of a porous carbon material are impregnated with tar pitch, resin, metal or an alloy is described.

[Patent Document 1] JP 2008-249129 A

SUMMARY OF INVENTION

Technical Problem

In the sliding bearing, when the load exerted on the sliding surface of the mating member from the sliding member is large, a contact portion between the sliding surface of the sliding member and the sliding surface of the mating member is heated, and seizing is likely to occur between the sliding member and the mating member. Seizing refers to deposition between the sliding member and the mating member, damage to a each sliding surface, or discoloration of each sliding surface.

When seizing occurs at the sliding bearing, the sliding member cannot smoothly slide on the sliding surface of the mating member. Therefore, a sliding bearing in which seizing is unlikely to occur even when a large load is exerted is required.

An object of the present invention is to provide a carbon material for bearings capable of realizing a sliding bearing in which an occurrence of seizing is inhibited and a sliding member made of the carbon material for bearings.

Solution to Problem (1) A carbon material for bearings according to one aspect of the present invention includes a porous carbon base material, and an impregnation material with which the carbon base material is impregnated, and made of resin or metal, wherein a cumulative pore volume of pores having a diameter larger than 0.1 μm is not more than 8 mm$^3$/g in a pore distribution measured by a mercury penetration method.

When the carbon material for bearings is used for the sliding member of the sliding bearing, an occurrence of seizing in the sliding bearing is inhibited.

(2) The cumulative pore volume of pores having diameter larger than 0.1 μm may be not more than 5 mm$^3$/g in the pore distribution measured by the mercury penetration method.

Thus, when the carbon material for bearings is used for the sliding member of the sliding bearing, an occurrence of seizing in the sliding bearing is more sufficiently inhibited.

(3) The carbon material for bearings may have Shore hardness of not more than 82 HS.

Thus, even when the sliding member formed of the carbon material for bearings is used for the sliding bearing and a larger load is applied to the sliding bearing, an occurrence of a flaw on the sliding surface of the mating member that comes into contact with the sliding member is prevented.

(4) Bulk density of the carbon base material may be not less than 1.7 Mg/m$^3$.

When the carbon material for bearings is used for the sliding member of the sliding bearing, the bulk density of the carbon base material is not less than 1.7 Mg/m$^3$, so that lubricity, which carbon essentially has, can be sufficiently maintained.

(5) Bulk density of the carbon base material may be not more than 1.8 Mg/m$^3$.

When the carbon material for bearings is used for the sliding member of the sliding bearing, the bulk density of the carbon base material is not more than 1.8 Mg/m$^3$, so that pores smaller than 0.1 μm can sufficiently contribute to inhibit seizing.

(6) A sliding member according to another aspect of the present invention used for a sliding bearing is formed of the above-mentioned carbon material for bearings.

When the above-mentioned carbon material for bearings is used for the sliding member of the sliding bearing, an occurrence of seizing in the sliding bearing is inhibited.

Therefore, the sliding bearing in which an occurrence of seizing is inhibited can be fabricated.

Advantageous Effects of Invention

The present invention causes the sliding bearing in which an occurrence of seizing is inhibited to be realized.

DESCRIPTION OF EMBODIMENTS

A carbon material for bearings according to one embodiment of the present invention and a sliding member made of the carbon material for bearings will be described below. The carbon material for bearings and the sliding member according to the present embodiment are used for a sliding bearing such as a thrust sliding bearing and a radial sliding bearing.

(1) Sliding Bearings

Figure 1:
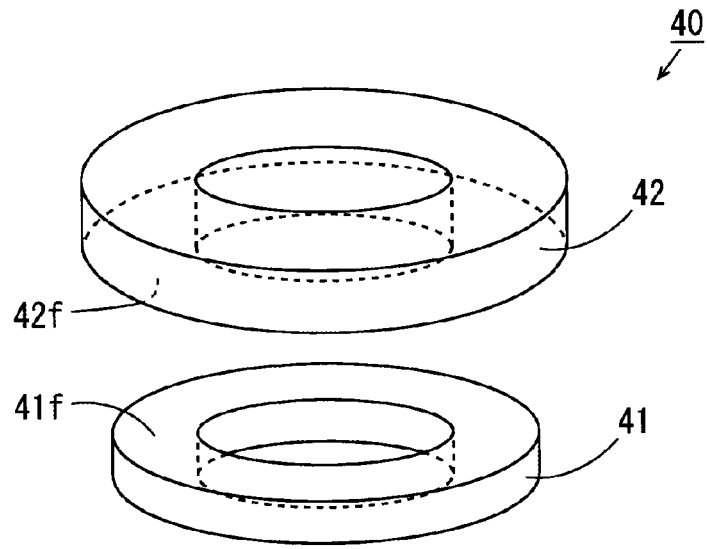
FIG. 1 is an exploded perspective view of a thrust sliding bearing.
Figure 2:
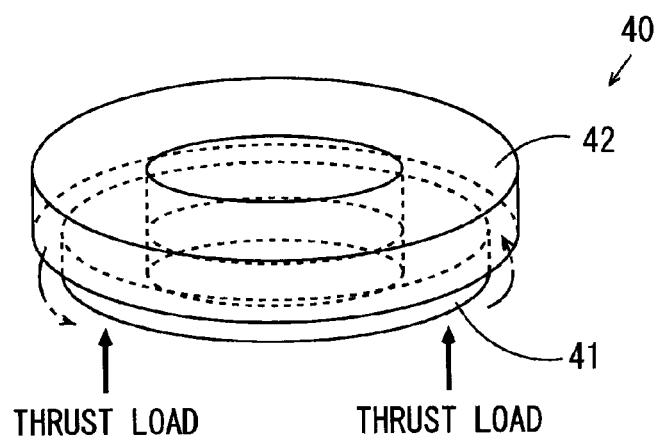
FIG. 2 is an external perspective view of the thrust sliding bearing of FIG. 1.
Figure 3:
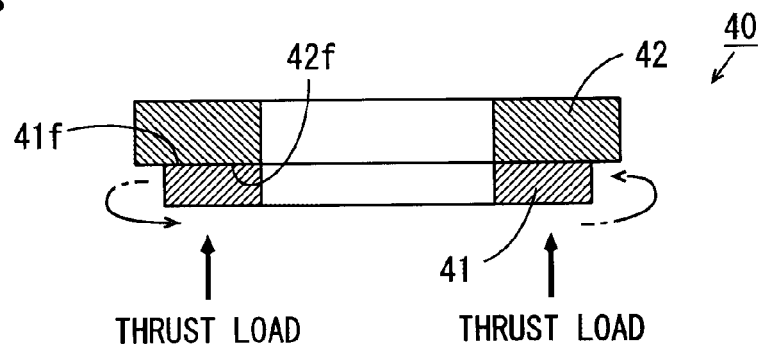
FIG. 3 is a longitudinal cross sectional view of the thrust sliding bearing of FIG. 1.

FIG. 1 is an exploded perspective view of the thrust sliding bearing, FIG. 2 is an external perspective view of the thrust sliding bearing of FIG. 1, and FIG. 3 is a longitudinal cross sectional view of the thrust sliding bearing of FIG. 1.

As shown in FIGS. 1 to 3, the thrust sliding bearing 40 includes a rotating sliding plate 41 and a stationary sliding plate 42 that are respectively annular. In this thrust sliding bearing 40, the rotating sliding plate 41 functions as a sliding member, and the stationary sliding plate 42 functions as a mating member. In the present example, inner diameters of the rotating sliding plate 41 and the stationary sliding plate 42 are substantially equal to each other. In the present example, an outer diameter of the stationary sliding plate 42 is larger than an outer diameter of the rotating sliding plate 41. The rotating sliding plate 41 and the stationary sliding plate 42 respectively have a sliding surface 41f and a sliding surface 42f that come into contact with each other.

When the thrust sliding bearing 40 is used, as indicated by one-dot dash arrows in FIGS. 2 and 3, with the sliding surface 41f of the rotating sliding plate 41 and the sliding surface 42f of the stationary sliding plate 42 being in contact with each other, the rotating sliding plate 41 is rotated relative to the stationary sliding plate 42 in a circumferential direction. Further, when the thrust sliding bearing 40 is used, as indicated by thick arrows in FIGS. 2 and 3, a thrust load applied towards the sliding surface 42f of the stationary sliding plate 42 is exerted on the rotating sliding plate 41.

In the present embodiment, the stationary sliding plate 42 is fabricated of stainless. The rotating sliding plate 41 is fabricated of the carbon material for bearings, described below. Thus, even when the thrust load exerted on the rotating sliding plate 41 is large, an occurrence of seizing in the thrust sliding bearing 40 is inhibited. Seizing refers to deposition between a rotating member and a stationary member, damage to a contact portion between the rotating member and the stationary member, or discoloration of the contact portion between the rotating member and the stationary member.

Figure 4:
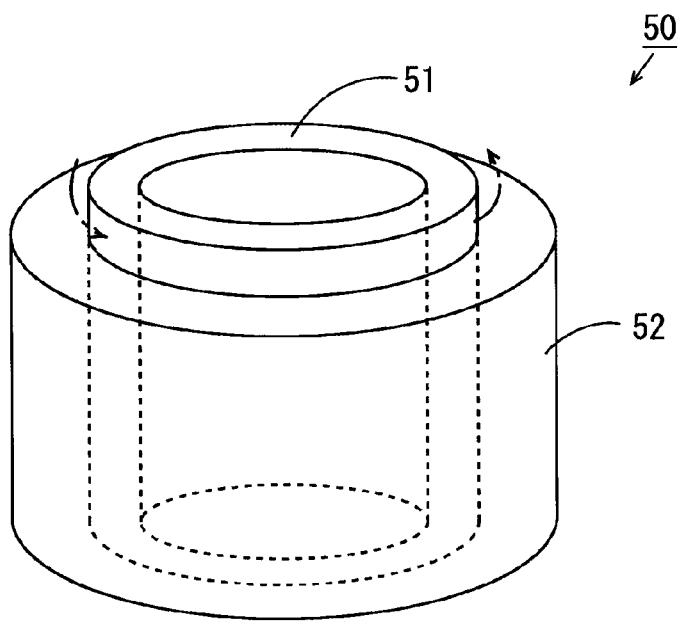
FIG. 4 is an external perspective view of a radial sliding bearing.
Figure 5:
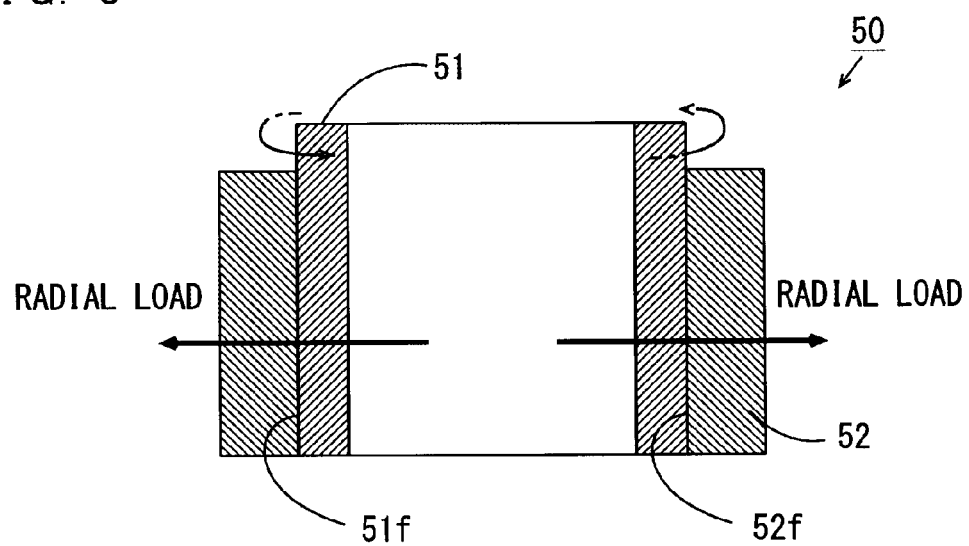
FIG. 5 is a longitudinal cross sectional view of the radial sliding bearing of FIG. 4.

FIG. 4 is an external perspective view of the radial sliding bearing, and FIG. 5 is a longitudinal cross sectional view of the radial sliding bearing of FIG. 4.

As shown in FIGS. 4 and 5, the radial sliding bearing 50 includes a rotating sliding tube 51 and a stationary sliding tube 52 that are respectively cylindrical. In this radial sliding bearing 50, the rotating sliding tube 51 functions as a sliding member, and the stationary sliding tube 52 functions as a mating member. An outer diameter of the rotating sliding tube 51 is slightly smaller than an inner diameter of the stationary sliding tube 52. With the rotating sliding tube 51 being inserted into the stationary sliding tube 52, an outer peripheral surface 51f of the rotating sliding tube 51 and an inner peripheral surface 52f of the stationary sliding tube 52 come into contact with each other.

When the radial sliding bearing 50 is used, as indicated by one-dot dash arrows in FIGS. 4 and 5, the rotating sliding tube 51 is rotated relative to the stationary sliding tube 52 in a circumferential direction. Further, when the radial sliding bearing 50 is used, as indicated by thick arrows in FIGS. 4 and 5, a radial load, which is applied towards the inner peripheral surface 52f of the stationary sliding tube 52, is exerted on the rotating sliding tube 51.

In the present embodiment, the stationary sliding tube 52 is fabricated of stainless. The rotating sliding tube 51 is fabricated of the carbon material for bearings, described below. Thus, even when the radial load applied to a contact portion between the rotating sliding tube 51 and the stationary sliding tube 52 is large, an occurrence of seizing in the radial sliding bearing 50 is inhibited.

(2) Carbon Material for Bearings and Method of Manufacturing Carbon Material for Bearings The carbon material for bearings used for the above-mentioned rotating sliding plate 41 and rotating sliding tube 51, and the method of manufacturing the carbon material for bearings will be described. The carbon material for bearings according to the present embodiment includes a carbon base material and an impregnation material.

The carbon base material is fabricated as described below, for example. First, a binder is added to carbon powder. Next, the mixture including the carbon powder and the binder is formed into a predetermined shape by a compression forming method, an extrusion forming method or a cold isostatic pressing method. Thereafter, a formed product is fired, so that the carbon base material is completed.

As the carbon powder, powder of artificial graphite, natural graphite, calcined coke, carbon black or coal tar pitch, or mixed powder including two or more of these types of powder can be used. As the binder, tar pitch, petroleum pitch, a phenol resin or the like can be used.

An impregnation process is performed on the carbon base material as described below, for example. As the impregnation material, a resin material such as a furan resin, or a phenol resin can be used.

When a resin material such as a furan resin or a phenol resin is used as the impregnation material, the carbon base material is immersed in the impregnation material (the resin material in the present example) in a chamber in which pressure is reduced from an atmospheric pressure to a predetermined pressure. In this state, a high pressure inert gas (nitrogen or argon, for example) is supplied to the chamber. Thus, the impregnation material is soaked into fine voids in the carbon base material. Thereafter, the carbon base material is lifted up from the impregnation material. Thus, the carbon material for bearings is completed.

Further, as the impregnation material, a metal material such as antimony, lead, copper or an alloy of these can be used instead of the resin material. When the metal material such as antimony, lead, copper or an alloy of these is used as the impregnation material, the carbon base material is immersed in the impregnation material in a molten state (the metal material in the present example) in a chamber in which pressure is reduced from an atmospheric pressure to a predetermined pressure. In this state, a high pressure inert gas (nitrogen or argon, for example) is supplied to the chamber. Thus, the impregnation material is soaked into the fine voids in the carbon base material. Thereafter, the carbon base material is lifted up from the impregnation material. Thus, the carbon material for bearings is completed.

The carbon material for bearings completed as described above is processed, so that the sliding member of the sliding bearing (the rotating sliding plate 41 and the rotating sliding tube 51 in the examples of FIGS. 2 and 4) can be fabricated.

The fabricated carbon material for bearings includes a plurality of pores. A pore distribution in the carbon material for bearings can be measured by a mercury penetration method using a mercury porosity meter. Specifically, a cumulative volume of pores having a size larger than a certain size (a radius or a diameter) can be measured by the mercury penetration method. Here, a radius and a diameter of pores refer to a radius and a diameter measured by the mercury penetration method regardless of a shape of pores. In the present specification, the size of pores is indicated by a diameter.

In the carbon material for bearings according to the present embodiment, a cumulative pore volume of pores having a diameter larger than 0.1 μm is not more than 8 mm$^3$/g. In this case, as described below, when the carbon material for bearings is used for the sliding member of the sliding bearing, an occurrence of seizing in the sliding bearing is inhibited.

Further, in the above-mentioned carbon material for bearings, the cumulative pore volume of pores having a diameter larger than 0.1 μm is preferably not more than 5 mm$^3$/g. In this case, as described below, when the carbon material for bearings is used for the sliding member of the sliding bearing, an occurrence of seizing in the sliding bearing is more sufficiently inhibited.

A cumulative pore volume of the carbon material for bearings is adjusted by a forming condition of the carbon base material (a forming pressure of the mixture and the like), a firing condition of the carbon base material (a firing time period, a firing temperature or the like), an impregnation processing condition of the carbon base material (an impregnation time period, an impregnation temperature or pressure during the impregnation process) or the like, for example.

In this case, as in an inventive example described below, a plurality of samples are fabricated under different conditions and a pore distribution is measured by the mercury penetration method using the mercury porosity meter, whereby a condition in which the cumulative pore volume of pores having a diameter larger than 0.1 μm is not more than 8 mm$^3$/g can be specified.

As long as the cumulative pore volume of pores having a diameter larger than 0.1 μm is not more than 8 mm$^3$/g, the conditions such as the forming condition of the carbon base material, the firing condition of the carbon base material and the impregnation processing condition of the carbon base material are not limited to specific values or specific ranges.

(3) Inventive Example

In the following, a plurality of samples of the sliding members were fabricated by different methods and under different conditions. As for each sample, a sliding test was performed after measurement of a cumulative pore volume, and a relationship between the cumulative pore volume and a result of the sliding test was evaluated.

(3-1) Fabrication of Samples

According to the method of the above-mentioned embodiment, samples 1 to 9, 11 to 14 of the sliding member were fabricated under respectively different fabricating conditions. Further, except that the impregnation process was not performed, the sample 10 was fabricated according to the same method as the above-mentioned embodiment.

Specifically, when each sample 1 to 14 was fabricated, about 40 parts by weight of a binder was first added to 100 parts by weight of carbon powder. Further, the mixture including the carbon powder and the binder was formed and the formed product was fired, so that a carbon base material was completed.

As shown in Tables 1, 2 and 3, described below, in the samples 1 to 14, two types of carbon powder were used. Further, in the samples 1 to 5, 8, 9, 11 to 14, tar pitch was used as the binder. In the samples 6, 7, 10, a phenol resin was used as the binder.

After the above-mentioned carbon base materials were completed, in the impregnation process for fabricating each samples 1, 3, 4, 5, 9, 11 to 14, each carbon base material was immersed in a furan resin (Kao Lightner EF-5102 manufactured by Kao Quaker Co., Ltd.: viscosity 25 mPa·s/25° C.) at a room temperature (25° C., for example) in a chamber. A thermal process was performed on each carbon base material after the impregnation process. Thus, the samples 1, 3, 4, 5, 9, 11 to 14 were completed. As for each of the samples 1, 3, 4, 5, 9, 11 to 14, an immersion time period in the furan resin was set to a predetermined time period of not less than 3 hours and not more than 24 hours.

In this case, it is possible to adjust cumulative pore volumes of the samples 1, 3, 4, 5, 9, 11 to 14 to different values by changing a fabricating condition such as a forming pressure of the carbon base material, a firing temperature of the carbon base material, a firing time period for the carbon base material, an immersion time period for the carbon base material in the furan resin, pressure in the chamber during the immersion of the carbon base material in the furan resin, a thermal processing temperature for the carbon base material after the impregnation process, a thermal processing time period for the carbon base material after the impregnation process or the like.

After the carbon base materials were completed, in the impregnation process for fabricating each sample 2, 8, each carbon base material was immersed for 24 hours in a phenol resin (PR-50781 manufactured by Sumitomo Bakelite Co., Ltd.: viscosity 80 mPa·s/25° C.) at a room temperature (25° C., for example) in a chamber. The thermal process was performed on each carbon base material after the impregnation process. Thus, the samples 2, 8 were completed.

In this case, it is possible to adjust cumulative pore volumes of the samples 2, 8 to different values by changing a fabricating condition such as a forming pressure of the carbon base material, a firing temperature of the carbon base material, a firing time period for the carbon base material, pressure in the chamber during the immersion of the carbon base material in the phenol resin, a thermal processing temperature for the carbon base material after the impregnation process, a thermal processing time period for the carbon base material after the impregnation process or the like.

After the carbon base material was completed, in an impregnation process for fabricating the sample 6, antimony was melt in a chamber in a vacuum state, and the carbon base material was immersed in the antimony. In this state, a nitrogen gas was supplied to the chamber at a pressure of 10 MPa and held for 30 minutes. Finally, the carbon base material was lifted up from the antimony, and the carbon base material was cooled. Thus, the sample 6 was completed.

A cumulative pore volume of the sample 6 can be adjusted by a fabricating condition such as a forming pressure of the carbon base material, a firing temperature of the carbon base material, a firing time period for the carbon base material or the like in addition to the above-mentioned fabricating conditions.

After the carbon base material was completed, in an impregnation process for fabricating the sample 7, lead was melted in a chamber in a vacuum state, and the carbon base material was immersed in the lead similarly to the impregnation process for fabricating the sample 6. In this state, a nitrogen gas was supplied to the chamber at a pressure of 5 MPa and held for 30 minutes. Finally, the carbon base material was lifted up from the lead, and the carbon base material was cooled. Thus, the sample 7 was completed.

A cumulative pore volume of the sample 7 can be adjusted by a fabricating condition such as a forming pressure of the carbon base material, a firing temperature of the carbon base material, a firing time period for the carbon base material or the like in addition to the above-mentioned fabricating conditions.

As described above, a furan resin was used as the impregnation material in each sample 1, 3, 4, 5, 9, 11 to 14, and a phenol resin was used as the impregnation material in each sample 2, 8. Further, antimony was used as the impregnation material in the sample 6, and lead was used as the impregnation material in the sample 7. The types of the impregnation material used for the above-mentioned samples 1 to 9, 11 to 14 are shown in the Tables 1 to 3.

The samples 1 to 14 are annular. An outer diameter is 65 mm, an inner diameter is 29 mm, and a height is 8.5 mm, for each sample 1 to 14.

(3-2) Cumulative Pore Volume

The cumulative pore volumes of the samples 1 to 14 were respectively measured by the mercury penetration method using the mercury porosity meter.

FIGS. 6 to 19 are graphs showing the cumulative pore volumes of the samples 1 to 14, respectively. In FIGS. 6 to 19, the ordinate indicates a cumulative pore volume, and the abscissa indicates a diameter of pores. A value of the cumulative pore volume in the diameter of each pore indicates the cumulative pore volume of pores having a diameter larger than the diameter. Therefore, the smaller a diameter of pores indicated by the abscissa is, the larger a cumulative pore volume is.

Figure 6:
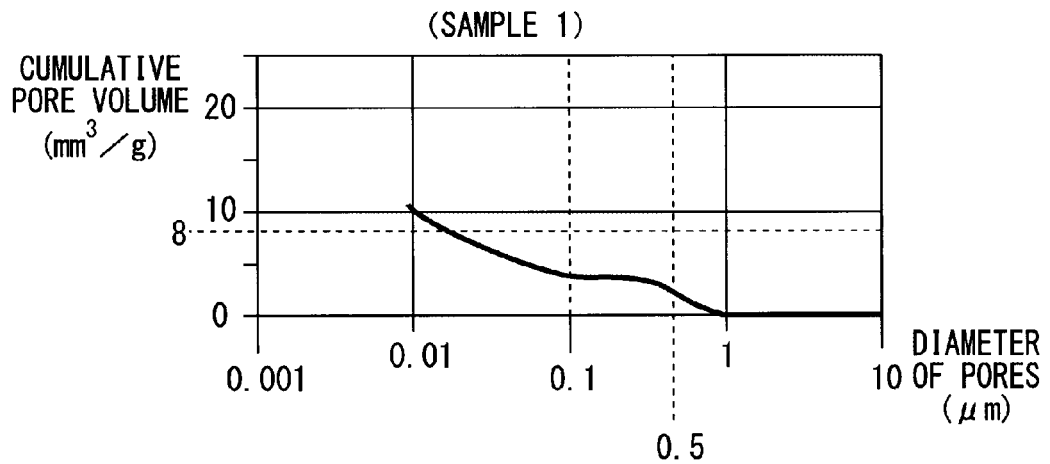
FIG. 6 is a graph showing a cumulative pore volume of a sample 1.

As shown in FIG. 6, in the sample 1, a cumulative pore volume of pores having a diameter larger than 0.5 μm was 2.2 mm$^3$/g, and a cumulative pore volume of pores having a diameter larger than 0.1 μm was 4.0 mm$^3$/g.

Figure 7:
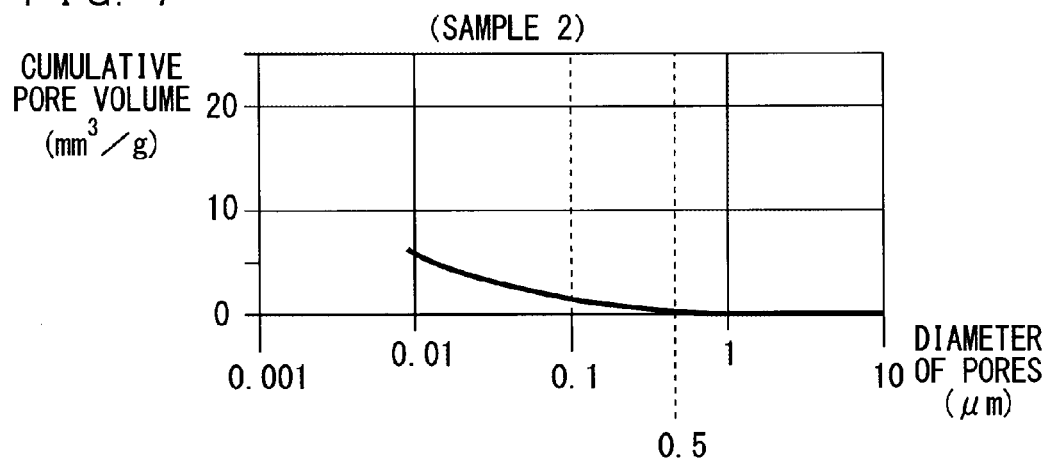
FIG. 7 is a graph showing a cumulative pore volume of a sample 2.

As shown in FIG. 7, in the sample 2, a cumulative pore volume of pores having a diameter larger than 0.5 μm was 1.1 mm$^3$/g, and a cumulative pore volume of pores having a diameter larger than 0.1 μm was 1.7 mm$^3$/g.

Figure 8:
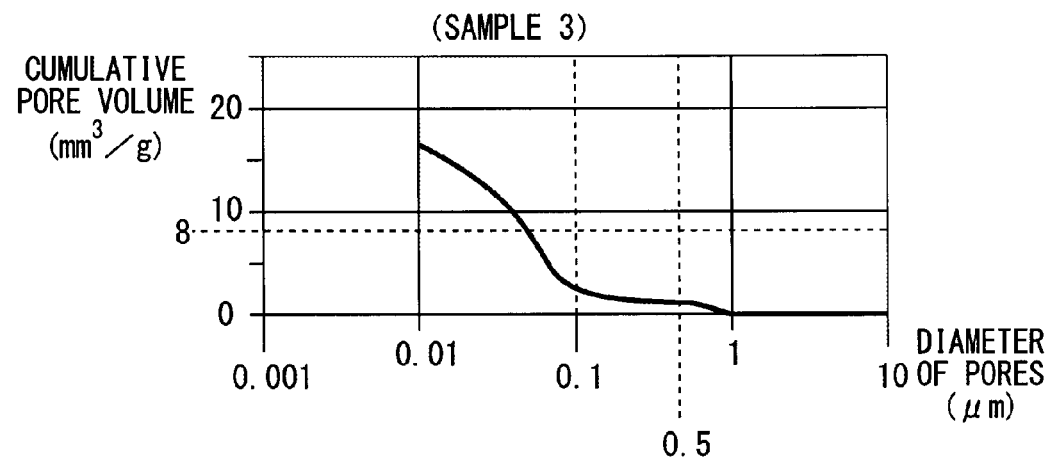
FIG. 8 is a graph showing a cumulative pore volume of a sample 3.

As shown in FIG. 8, in the sample 3, a cumulative pore volume of pores having a diameter larger than 0.5 μm was 0.7 mm$^3$/g, and a cumulative pore volume of pores having a diameter larger than 0.1 μm was 2.3 mm$^3$/g.

Figure 9:
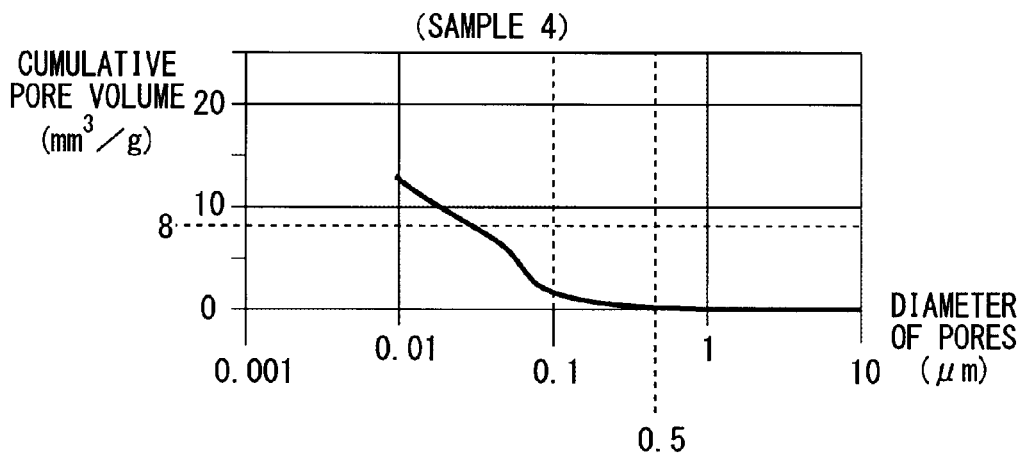
FIG. 9 is a graph showing a cumulative pore volume of a sample 4.

As shown in FIG. 9, in the sample 4, a cumulative pore volume of pores having a diameter larger than 0.5 μm was 0.5 mm$^3$/g, and a cumulative pore volume of pores having a diameter larger than 0.1 μm was 1.5 mm$^3$/g.

Figure 10:
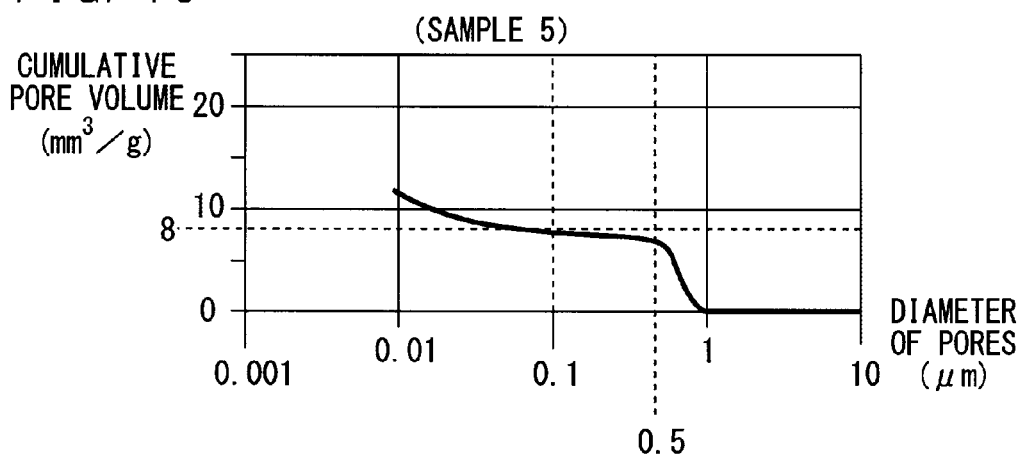
FIG. 10 is a graph showing a cumulative pore volume of a sample 5.

As shown in FIG. 10, in the sample 5, a cumulative pore volume of pores having a diameter larger than 0.5 μm was 6.8 mm$^3$/g, and a cumulative pore volume of pores having a diameter larger than 0.1 μm was 7.8 mm$^3$/g.

Figure 11:
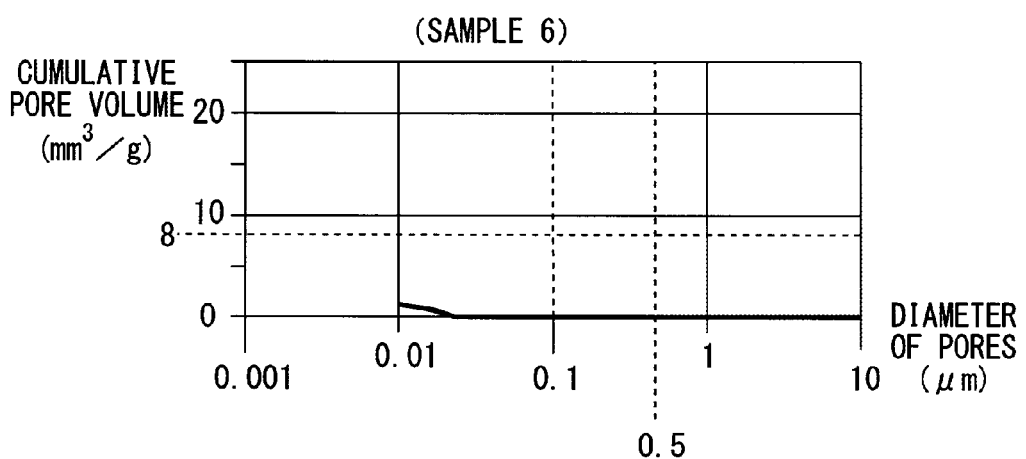
FIG. 11 is a graph showing a cumulative pore volume of a sample 6.

As shown in FIG. 11, in the sample 6, a cumulative pore volume of pores having a diameter larger than 0.5 μm was smaller than 0.1 mm$^3$/g, and a cumulative pore volume of pores having a diameter larger than 0.1 μm was smaller than 0.1 mm$^3$/g.

Figure 12:
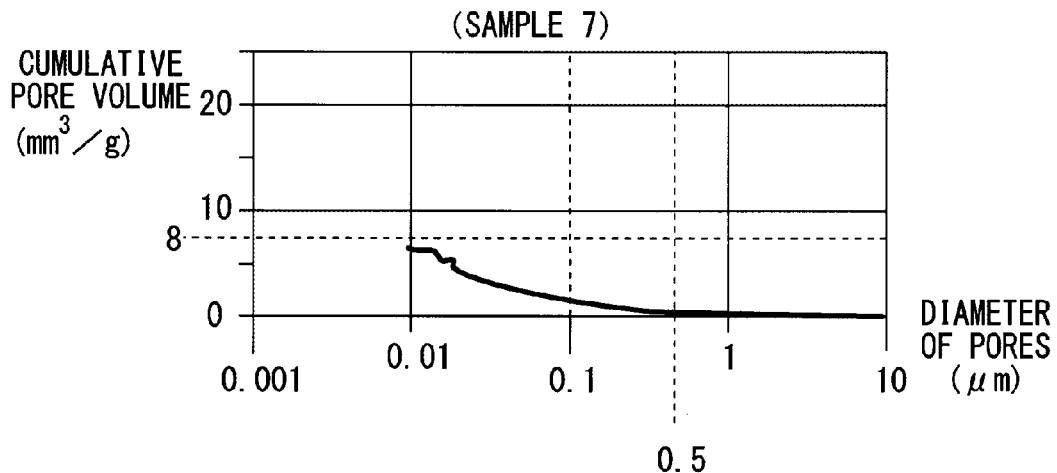
FIG. 12 is a graph showing a cumulative pore volume of a sample 7.

As shown in FIG. 12, in the sample 7, a cumulative pore volume of pores having a diameter larger than 0.5 μm was 0.2 mm$^3$/g, and a cumulative pore volume of pores having a diameter larger than 0.1 μm was 1.6 mm$^3$/g.

Figure 13:
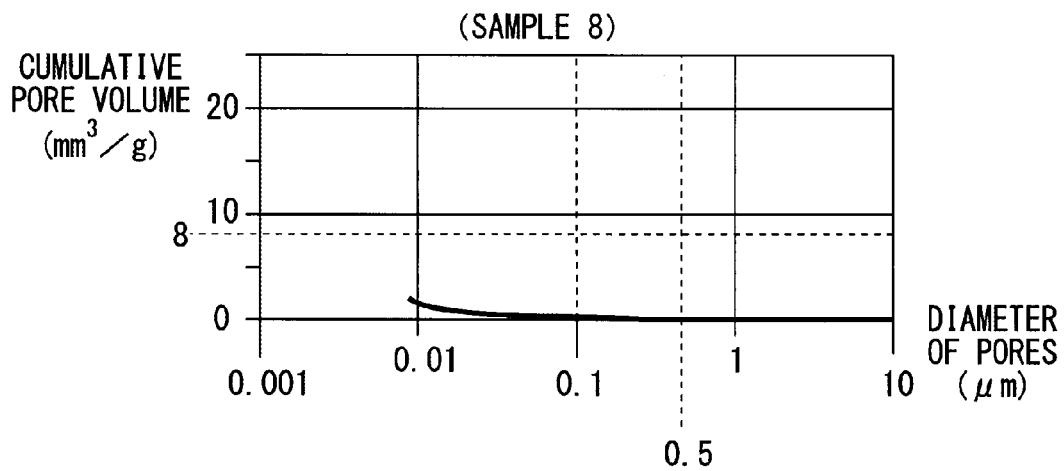
FIG. 13 is a graph showing a cumulative pore volume of a sample 8.

As shown in FIG. 13, in the sample 8, a cumulative pore volume of pores having a diameter larger than 0.5 μm was smaller than 0.1 mm$^3$/g, and a cumulative pore volume of pores having a diameter larger than 0.1 μm was 0.2 mm$^3$/g.

Figure 14:
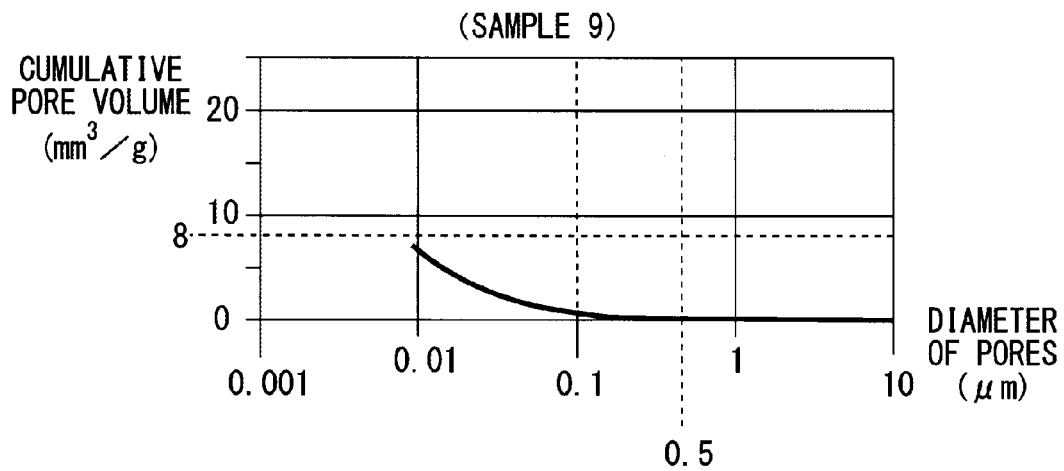
FIG. 14 is a graph showing a cumulative pore volume of a sample 9.

As shown in FIG. 14, in the sample 9, a cumulative pore volume of pores having a diameter larger than 0.5 μm was smaller than 0.1 mm$^3$/g, and a cumulative pore volume of pores having a diameter larger than 0.1 μm was 0.8 mm$^3$/g.

Figure 15:
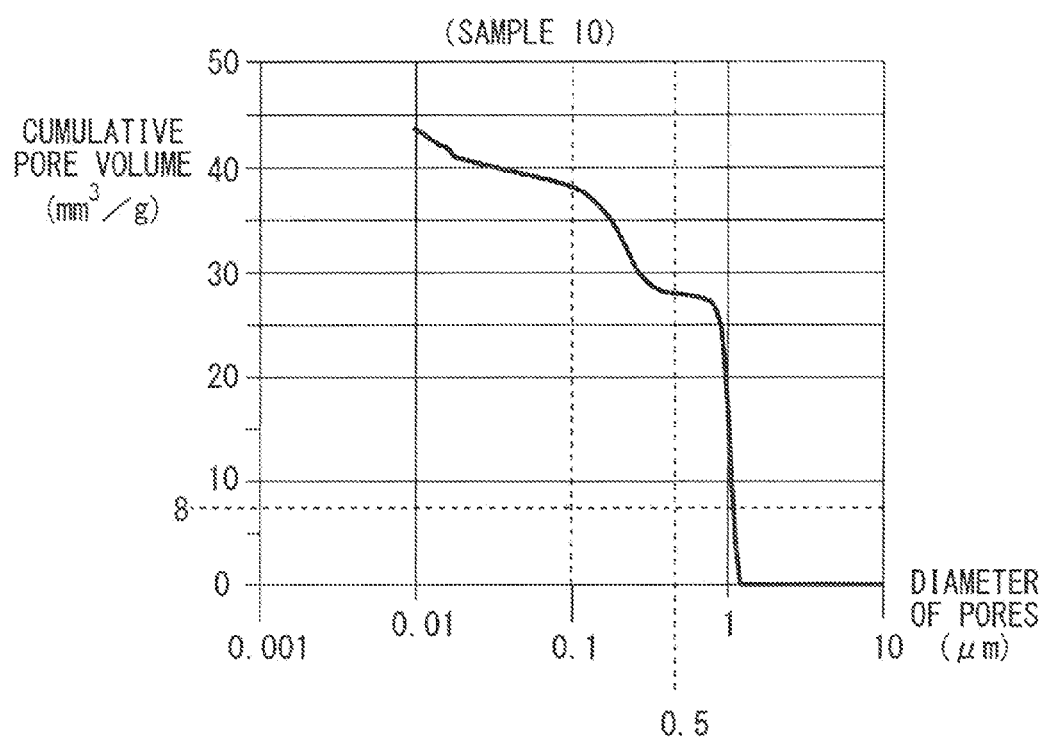
FIG. 15 is a graph showing a cumulative pore volume of a sample 10.

As shown in FIG. 15, in the sample 10, a cumulative pore volume of pores having a diameter larger than 0.5 μm was 28.6 mm$^3$/g, and a cumulative pore volume of pores having a diameter larger than 0.1 μm was 38.7 mm$^3$/g.

Figure 16:
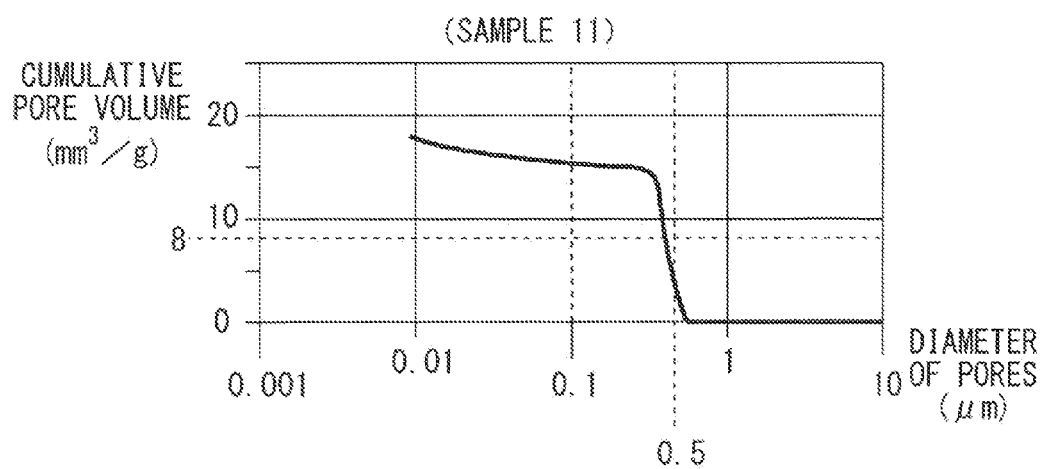
FIG. 16 is a graph showing a cumulative pore volume of a sample 11.

As shown in FIG. 16, in the sample 11, a cumulative pore volume of pores having a diameter larger than 0.5 μm was 1.8 mm$^3$/g, and a cumulative pore volume of pores having a diameter larger than 0.1 μm was 15.4 mm$^3$/g.

Figure 17:
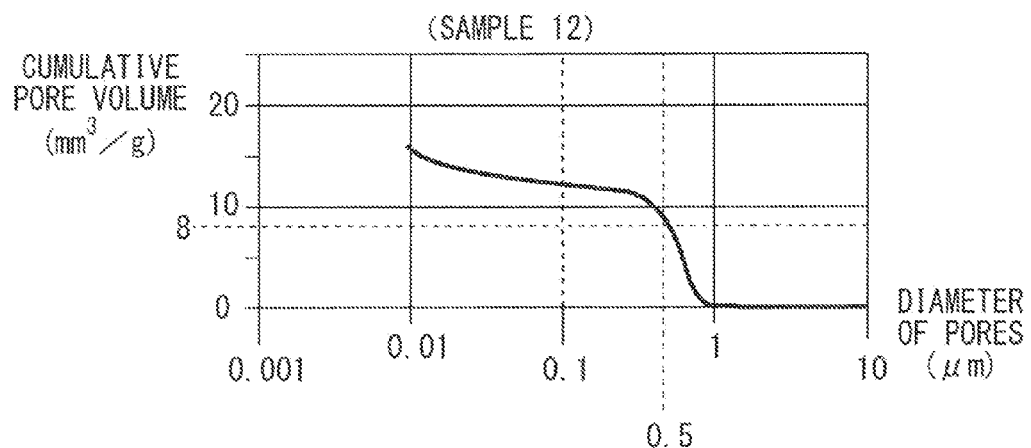
FIG. 17 is a graph showing a cumulative pore volume of a sample 12.

As shown in FIG. 17, in the sample 12, a cumulative pore volume of pores having a diameter larger than 0.5 μm was 8.8 mm$^3$/g, and a cumulative pore volume of pores having a diameter larger than 0.1 μm was 12.4 mm$^3$/g.

Figure 18:
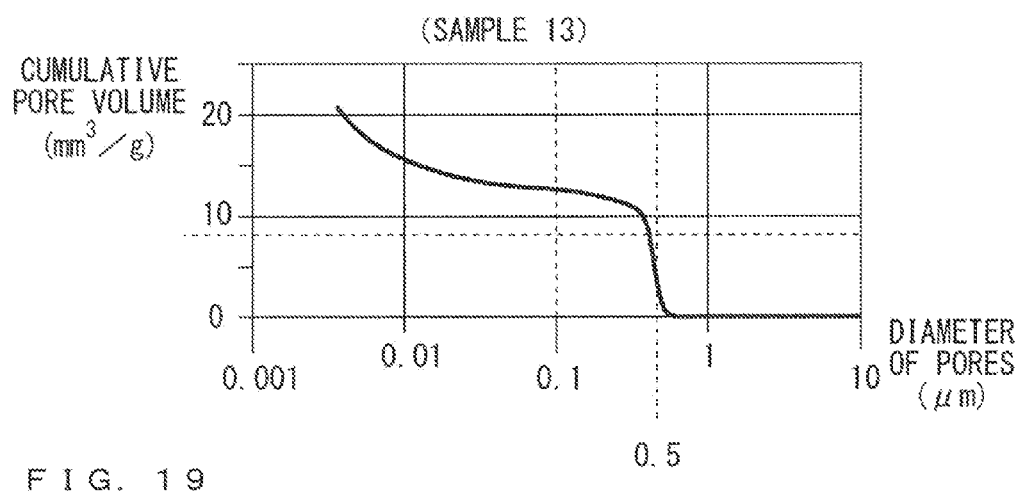
FIG. 18 is a graph showing a cumulative pore volume of a sample 13.

As shown in FIG. 18, in the sample 13, a cumulative pore volume of pores having a diameter larger than 0.5 μm was 2.7 mm$^3$/g, and a cumulative pore volume of pores having a diameter larger than 0.1 μm was 12.9 mm$^3$/g.

Figure 19:
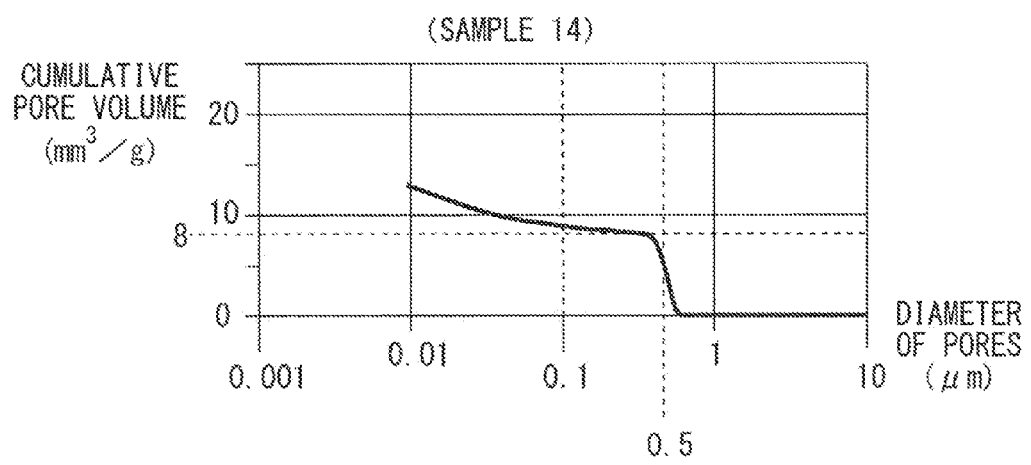
FIG. 19 is a graph showing a cumulative pore volume of a sample 14.

As shown in FIG. 19, in the sample 14, a cumulative pore volume of pores having a diameter larger than 0.5 μm was 4.6 mm$^3$/g, and a cumulative pore volume of pores having a diameter larger than 0.1 μm was 9.0 mm$^3$/g.

As described above, as for each sample 1 to 9, the cumulative pore volume of pores having a diameter larger than 0.1 μm was not more than 8 mm$^3$/g. On the one hand, as for each sample 10 to 14, the cumulative pore volume of pores having a diameter larger than 0.1 μm was larger than 8 mm$^3$/g.

The measurement results of the cumulative pore volumes of the samples 1 to 5 are shown in Table 1, the measurement results of the cumulative pore volumes of the samples 6 to 9 are shown in Table 2, and the measurement results of the cumulative pore volumes of the samples 10 to 14 are shown in Table 3.

TABLE 1

|  |  | SAMPLE 1 | SAMPLE 2 | SAMPLE 3 | SAMPLE 4 | SAMPLE 5 |
|---|---|---|---|---|---|---|
| Mixture Ratio of Carbon Powder (Weight Ratio) | Artificial Graphite | 40 | 40 | 50 | 50 | 45 |
|  | Natural Graphite | 60 | 60 | 50 | 50 | 55 |
|  | Calcined Coke | — | — | — | — | — |
|  | Carbon Black | — | — | — | — | — |
| Presence of Impregnation Material | Furan Resin | Yes | — | Yes | Yes | Yes |
|  | Phenol Resin | — | Yes | — | — | — |
|  | Antimony | — | — | — | — | — |
|  | Lead Alloy | — | — | — | — | — |
| Bulk Density (Mg/m$^3$) | Carbon Base Material | 1.79 | 1.74 | 1.77 | 1.79 | 1.80 |
|  | Carbon Base Material for Bearings | 1.88 | 1.89 | 1.86 | 1.88 | 1.86 |
| Physical Properties | Shore Hardness (HS) | 79 | 76 | 82 | 81 | 76 |
|  | Bending Strength (MPa) | 69 | 67 | 64 | 74 | 74 |
|  | Compression Strength (MPa) | 230 | 220 | 215 | 240 | 230 |
| Cumulative Pore Volume of Pores Having a Diameter larger than 0.5 μm (mm$^3$/g) |  | 2.2 | 1.1 | 0.7 | 0.5 | 6.8 |
| Cumulative Pore Volume of Pores Having a Diameter larger than 0.1 μm (mm$^3$/g) |  | 4.0 | 1.7 | 2.3 | 1.5 | 7.8 |
| Results of Sliding Test | Maximum Allowable Load at which seizing does not occur (MPa) | ⊚ 20.9 | ⊚ 17.4 | ⊚ 20.9 | ⊚ 20.9 | ○ 12.2 |
|  | Presence of Flaw on Sliding Surface of Mating Member | No | No | No | No | No |

TABLE 2

|  |  | SAMPLE 6 | SAMPLE 7 | SAMPLE 8 | SAMPLE 9 |
|---|---|---|---|---|---|
| Mixture Ratio of Carbon Powder (Weight Ratio) | Artificial Graphite | 50 | 50 | — | 60 |
|  | Natural Graphite | 50 | 50 | 35 | — |
|  | Calcined Coke | — | — | 65 | — |
|  | Carbon Black | — | — | — | 40 |
| Presence of Impregnation Material | Furan Resin | — | — | — | Yes |
|  | Phenol Resin | — | — | Yes | — |
|  | Antimony | Yes | — | — | — |
|  | Lead Alloy | — | Yes | — | — |
| Bulk Density (Mg/m$^3$) | Carbon Base Material | 1.76 | 1.76 | 1.78 | 1.74 |
|  | Carbon Base Material for Bearings | 2.21 | 2.41 | 1.86 | 1.84 |
| Physical Properties | Shore Hardness (HS) | 80 | 75 | 109 | 89 |
|  | Bending Strength (MPa) | 78 | 73 | 82 | 71 |
|  | Compression Strength (MPa) | 220 | 205 | 350 | 200 |
| Cumulative Pore Volume of Pores Having a Diameter larger than 0.5 μm (mm$^3$/g) |  | <0.1 | 0.2 | <0.1 | <0.1 |
| Cumulative Pore Volume of Pores Having a Diameter larger than 0.1 μm (mm$^3$/g) |  | <0.1 | 1.6 | 0.2 | 0.8 |
| Results of Sliding Test | Maximum Allowable Load at which seizing does not occur (MPa) | ⊚ 20.9 | ⊚ 19.1 | ⊚ 15.6 | ⊚ 13.9 |
|  | Presence of Flaw on Sliding Surface of Mating Member | No | No | Yes | Yes |

TABLE 3

| | | SAMPLE 10 | SAMPLE 11 | SAMPLE 12 | SAMPLE 13 | SAMPLE 14 |
|---|---|---|---|---|---|---|
| Mixture Ratio of Carbon Powder (Weight Ratio) | Artificial Graphite | 50 | 35 | 50 | 50 | 45 |
| | Natural Graphite | 50 | 65 | 50 | 50 | 55 |
| | Calcined Coke | — | — | — | — | — |
| | Carbon Black | — | — | — | — | — |
| Presence of Impregnation Material | Furan Resin | — | Yes | Yes | Yes | Yes |
| | Phenol Resin | — | — | — | — | — |
| | Antimony Lead Alloy | — | — | — | — | — |
| Bulk Density (Mg/m$^3$) | Carbon Base Material | 1.76 | 1.80 | 1.81 | 1.74 | 1.78 |
| | Carbon Base Material for Bearings | — | 1.85 | 1.85 | 1.85 | 1.85 |
| Physical Properties | Shore Hardness (HS) | 70 | 74 | 77 | 65 | 76 |
| | Bending Strength (MPa) | 60 | 62 | 66 | 64 | 60 |
| | Compression Strength (MPa) | 170 | 220 | 195 | 215 | 230 |
| Cumulative Pore Volume of Pores Having a Diameter larger than 0.5 μm (mm$^3$/g) | | 28.6 | 1.8 | 8.8 | 2.7 | 4.6 |
| Cumulative Pore Volume of Pores Having a Diameter larger than 0.1 μm (mm$^3$/g) | | 38.7 | 15.4 | 12.4 | 12.9 | 9.0 |
| Results of Sliding Test | Maximum | x | x | x | x | x |
| | Allowable Load at which seizing does not occur (MPa) | 3.5 | 5.2 | 5.2 | 7.0 | 8.7 |
| | Presence of Flaw on Sliding Surface of Mating Member | No | No | No | No | No |

(3-3) Bulk Density, Shore Hardness, Bending Strength and Compression Strength

The bulk density of the carbon base material of each sample 1 to 14 was measured using a portion of the carbon base material formed in the process of fabrication of each sample 1 to 14. The bulk density was measured using a test piece of 10×10×60 mm in conformity with a physical characteristics testing method for graphite materials defined in JIS R 7222.

Further, the bulk density of each carbon material for bearings was measured using a portion of each carbon material for bearings acquired in the process of fabrication of the samples 1 to 14 by the above-mentioned method. As for the sample 10, the impregnation process is not performed, so that the carbon material and the carbon material for bearings are the same.

In Tables 1 to 3, described above, the measurement results of the bulk density of the carbon base material and the bulk density of the carbon material for bearings of the samples 1 to 14 are shown.

Further, the Shore hardness, the bending strength and the compression strength were measured as the physical properties of each sample 1 to 14 using a portion of each sample 1 to 14. The Shore hardness was measured in conformity with the Shore hardness test defined in JIS (Japanese Industrial Standard) Z 2246. A D-type Shore hardness meter was used for the measurement of the Shore hardness. The bending strength was measured using a test piece of 10×10×60 mm in conformity with the physical characteristics testing method for graphite materials defined in JIS R 7212. The compression strength was measured using a test piece of 10×10×10 mm in conformity with the physical characteristics testing method for graphite materials defined in JIS R 7222.

In Tables 1 to 3, described above, the measurement results of the Shore hardness, the bending strength and the compression strength of the samples 1 to 14 are shown.

(3-4) Sliding Testing Method

The sliding testing method for the samples 1 to 14 will be described. First, 14 mating members respectively corresponding to the samples 1 to 14 were prepared. Each mating member was fabricated of stainless (SUS420J1). Further, each mating member has a flat sliding surface.

Subsequently, one surface of each sample 1 to 14 was brought into contact with the sliding surface of the corresponding mating member. In this state, the mating member corresponding to each sample 1 to 14 was arranged in warm water at 60° C.

Next, a load was applied towards the sliding surface of the corresponding mating member from each sample 1 to 14. In this state, each sample 1 to 14 was rotated relative to the corresponding mating member using a motor, whereby each sample 1 to 14 slid with respect to each mating member. A value of a current flowing in the motor was measured while the rotation speed of each sample 1 to 14 was kept at 3000 rpm.

After the rotation of each sample 1 to 14 was started, a load applied to each sample 1 to 14 was increased by a constant value every 10 minutes. When seizing occurs between each sample 1 to 14 and the corresponding mating member, the value of the current flowing in the motor abruptly changes. Therefore, it was considered that seizing occurred at a time point at which the value of the current flowing in the motor abruptly changed (a time point at which a change ratio of the current flowing in the motor exceeded 30 A/sec in the present example), and the rotation of each sample 1 to 14 was stopped.

As for each sample 1 to 14, a load smaller by the above-mentioned constant value than the load applied at the time point at which the value of the current flowing in the motor abruptly changed was recorded as a maximum load at which seizing did not occur in each sample 1 to 14 (hereinafter referred to as a maximum allowable load). Further, the sliding surface of the corresponding mating member after the rotation of each sample 1 to 14 was stopped was visually observed, and it was determined whether there was a flaw on the sliding surface of each mating member.

(3-5) Results of Sliding Test

In Tables 1 to 3, described above, the results of the sliding test of the samples 1 to 14 are shown.

As shown in Table 1, maximum allowable loads of the samples 1 to 5 were respectively 20.9 MPa, 17.4 MPa, 20.9 MPa, 20.9 MPa and 12.2 MPa. As shown in Table 2, maximum allowable loads of the samples 6 to 9 were respectively 20.9 MPa, 19.1 MPa, 15.6 MPa and 13.9 MPa. As shown in Table 3, maximum allowable loads of the samples 10 to 14 were respectively 3.5 MPa, 5.2 MPa, 5.2 MPa, 7.0 MPa and 8.7 MPa.

When the sliding bearing is normally used, a load smaller than 5 MPa is exerted. However, a load about 10 MPa is sometimes temporarily exerted. Therefore, a maximum allowable load of the sliding bearing is preferably not less than 10 MPa, is more preferably not less than 12 MPa, and is even more preferably not less than 13 MPa. In Tables 1 to 3, "○" is applied for more preferable maximum allowable load, "⊚" is applied for even more preferable maximum allowable load, and "×" is applied for not preferable maximum allowable load.

As described above, in each sample 1 to 9, the cumulative pore volume of pores having a diameter larger than 0.1 µm is not more than 8 $mm^3/g$. As for each of these samples 1 to 9, seizing did not occur until the applied load reached at least 12.2 MPa. In Tables 1 and 2, an underline is applied for each cumulative pore volume in a case in which seizing did not occur.

On the one hand, in the samples 10 to 14, the cumulative pore volume of pores having a diameter larger than 0.1 µm is larger than 8 $mm^3/g$. As for each of these samples 10 to 14, seizing occurred when the applied load was not more than 8.7 MPa.

As a result, it became apparent that, when the sliding member in which the cumulative pore volume of pores having a diameter larger than 0.1 µm was not more than 8 $mm^3/g$ was used, an occurrence of seizing was inhibited as compared to a case where the sliding member in which the cumulative pore volume of pores having a pore diameter larger than 0.1 µm was larger than 8 $mm^3/g$ was used.

Further, in each sample 1 to 4, 6 to 9, the cumulative pore volume of pores having a diameter larger than 0.1 µm is not more than 5 $mm^3/g$. As for each of these samples 1 to 4, 6 to 9, seizing did not occur until the applied load reached at least 13.9 MPa.

As a result, it became apparent that, when the sliding member in which the cumulative pore volume of pores having a diameter larger than 0.1 µm was not more than 5 $mm^3/g$ was used, an occurrence of seizing was more sufficiently inhibited as compared to a case where the sliding member in which the cumulative pore volume of pores having a pore diameter larger than 0.1 µm was larger than 5 $mm^3/g$ was used.

While a lower limit of the cumulative pore volume of pores having a diameter larger than 0.1 µm is not specifically limited, the cumulative pore volume of pores having a diameter larger than 0.1 µm is not less than 0.2 $mm^3/g$ in each sample 1 to 5, 7 to 9. Further, in each sample 1 to 5, 7, the cumulative pore volume of pores having a diameter larger than 0.1 µm is not less than 1 $mm^3/g$. Further, in each sample 1, 3, 5, the cumulative pore volume of pores having a diameter larger than 0.1 µm is not less than 2 $mm^3/g$. Further, in each sample 1, 5, the cumulative pore volume of pores having a diameter larger than 0.1 µm is not less than 4 $mm^3/g$. Further, in the sample 6, the cumulative pore volume of pores having a diameter larger than 0.1 µm is larger than 0 $mm^3/g$ and smaller than 0.1 $mm^3/g$.

Further, as shown in Tables 1 to 3, a flaw was not confirmed at the mating members respectively corresponding to the samples 1 to 7. The Shore hardness of each sample 1 to 7 is not more than 82 HS. On the one hand, as shown in Table 2, a flaw was confirmed at each of the mating members respectively corresponding to the samples 8, 9.

The Shore hardness of each samples 8, 9 is larger than 82 HS. Thus, it became apparent that, in a case in in which the Shore hardness of the sliding member was not more than 82 HS, even when a large load such as 20.9 MPa was applied, an occurrence of a flaw at the mating member could be prevented. It is considered that the Shore hardness of the sample 8 is higher than the Shore hardness of each sample 1 to 7 because calcined coke is used as the carbon powder in the sample 8. Similarly, it is considered that the Shore hardness of the sample 9 is higher than the Shore hardness of each sample 1 to 7 because carbon black is used as the carbon powder in the sample 9.

As for each sample 10 to 14, it is considered that a flaw did not occur at the mating member because the applied maximum load was small and not more than 8.7 MPa.

Further, as shown in Tables 1 and 2, each sample 1 to 9 has the Shore hardness of not less than 75 HS and not more than 109 HS. Thus, an occurrence of seizing can be inhibited while abrasion resistance of the sliding member is ensured. In this manner, the Shore hardness of the sliding member is preferably not less than 75 HS. Further, the Shore hardness of the sliding member is not more than 109 HS, for example. When a large load is applied, the Shore hardness is preferably not more than 82 HS as described above.

Further, as shown in Tables 1 and 2, each sample 1 to 9 has the bending strength of not less than 64 MPa and not more than 82 MPa and the compression strength of not less than 205 MPa and not more than 350 MPa. Thus, an occurrence of seizing can be inhibited while mechanic strength of the sliding member is ensured. In this manner, the bending strength of the sliding member is preferably not less than 64 MPa. The compression strength of the sliding member is preferably not less than 205 MPa. Further, the bending strength of the sliding member is not more than 82 MPa, for example. The compression strength of the sliding member is not more than 350 MPa, for example.

Further, as shown in Tables 1 and 2, the carbon base material of each sample 1 to 9 has the bulk density of not less than 1.74 $Mg/m^3$ and not more than 1.80 $Mg/m^3$. On the one hand, the carbon base material of each sample 10 to 14 has the bulk density of not less than 1.74 $Mg/m^3$ and not more than 1.81 $Mg/m^3$. In this manner, each sample 1 to 9 has the bulk density of not less than 1.7 $Mg/m^3$ and not more than 1.8 $Mg/m^3$ substantially equal to each sample 10 to 14.

As for each sample 1 to 9, it is considered that a total volume of pores having a diameter of not more than 0.1 µm is relatively large since the cumulative pore volume of pores having a diameter larger than 0.1 μm is small and not more than 8 mm³/g. Therefore, in each sample 1 to 9, it is considered that pores smaller than 0.1 μm contribute to inhibit an occurrence of seizing. Therefore, the bulk density of the carbon base material is not more than 1.8 Mg/m, so that the pores smaller than 0.1 μm can sufficiently contribute to inhibit seizing. Further, the bulk density of the carbon base material is not less than 1.7 Mg/m³, so that lubricity, which carbon essentially has, can be sufficiently maintained in the sliding member.

(4) Effects of Embodiment

In the carbon material for bearings according to the present embodiment, the cumulative pore volume of pores having a diameter larger than 0.1 μm is not more than 8 mm³/g. When such a carbon material for bearings is used for the sliding member of the sliding bearing, an occurrence of seizing in the sliding bearing is inhibited.

In the carbon material for bearings, the cumulative pore volume of pores having a diameter larger than 0.1 μm is preferably not more than 5 mm³/g. Thus, when the carbon material for bearings is used for the sliding member of the sliding bearing, an occurrence of seizing in the sliding bearing is more sufficiently inhibited.

The Shore hardness of the carbon material for bearings is preferably not more than 82 HS. Thus, even when a load larger than 12 MPa is applied, an occurrence of a flaw on the sliding surface of the mating member that comes into contact with the sliding surface of the sliding member is prevented. For example, in the thrust sliding bearing 40 of FIG. 2, an occurrence of a flaw on the sliding surface 42f of the stationary sliding plate 42 that comes into contact with the rotating sliding plate 41 is prevented. Further, in the radial sliding bearing 50 of FIG. 4, an occurrence of a flaw on the inner peripheral surface 52f of the stationary sliding tube 52 that comes into contact with the rotating sliding tube 51 is prevented.

(5) Canned Motor Pump

Figure 20:
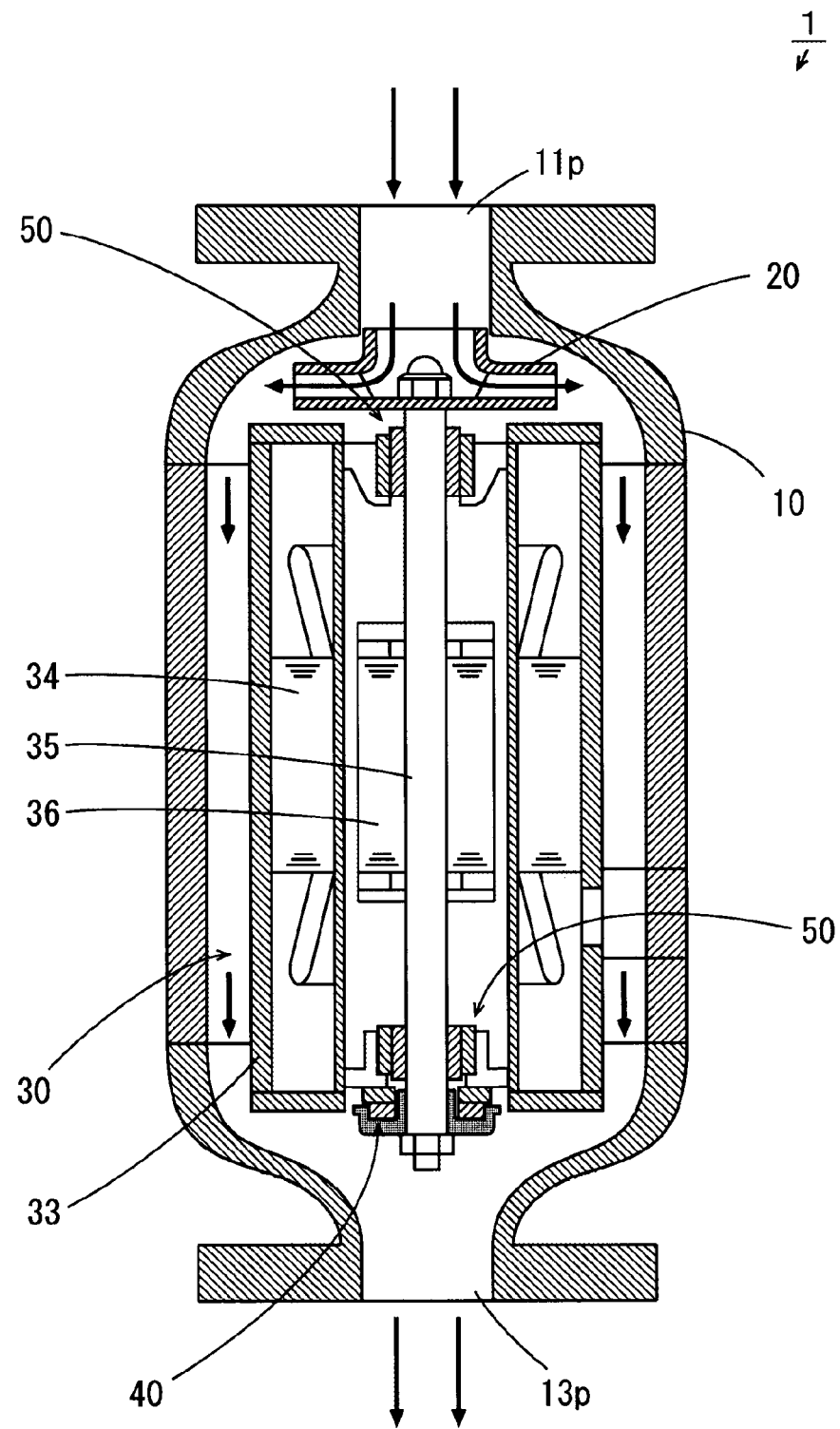
FIG. 20 is a longitudinal cross sectional view showing one example of a configuration of a canned motor pump.

The thrust sliding bearing 40 of FIG. 2 and the radial sliding bearing 50 of FIG. 4 can be used for the canned motor pump, for example. FIG. 20 is a longitudinal cross sectional view showing one example of the configuration of the canned motor pump. The canned motor pump 1 of FIG. 20 is mainly constituted by a pump casing 10, an impeller 20 and the canned motor 30.

An inlet port 11p is formed at the upper end of the pump casing 10, and a discharge port 13p is formed at the lower end of the pump casing 10. The impeller 20 and the canned motor 30 are stored inside of the pump casing 10. The canned motor 30 includes a stator storing casing 33, a stator 34, a rotation shaft 35 extending in the top-and-bottom direction, a rotator 36, the one thrust sliding bearing 40 and the two radial sliding bearings 50.

The impeller 20 is attached to the upper end of the rotation shaft 35. The stator storing casing 33 has a double tube configuration with the both ends closed. The stator 34 is stored between an inner tube and an outer tube. In this state, the stator storing casing 33 is fixed to an inner peripheral surface of the pump casing 10 to surround the rotation shaft 35. The rotator 36 is attached to a center portion of the rotation shaft 35 inside of the stator storing casing 33.

The one thrust sliding bearing 40 and the two radial sliding bearings 50 are attached to the inner tube of the stator storing casing 33. The rotation shaft 35 is rotatably supported relative to the stator 34 by the one thrust sliding bearing 40 and the two radial sliding bearings 50.

In this canned motor pump 1, the rotator 36 is rotated, so that the rotation shaft 35 and the impeller 20 are rotated. The impeller 20 is rotated, so that liquid (water, for example) flows in the pump casing 10 from the inlet port 11p. The liquid flowing in the pump casing 10 is discharged from the discharge port 13p.

As described above, the thrust sliding bearing 40 and the radial sliding bearing 50 include the rotating sliding plate 41 and the rotating sliding tube 51 formed of the carbon material for bearings. Thus, even when a thrust load increases due to an increase in a discharge flow rate of the liquid by the canned motor pump 1, an occurrence of seizing in the thrust sliding bearing 40 is inhibited. Further, even when the radial load increases, an occurrence of seizing in the radial sliding bearing 50 is inhibited. Therefore, an adjustable range of the discharge flow rate of the liquid of the canned motor pump 1 can be increased.

The above-mentioned carbon material for bearings can also be used for a sliding bearing provided in a mechanic structure (an engine, a turbine or the like) other than the canned motor pump. In this case, an occurrence of seizing during the use of the mechanic structure is inhibited.

(6) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the rotating sliding plate 41 and the rotating sliding tube 51 are examples of a sliding member.

As each of constituent elements recited in the claims, various other elements having configurations or functions described in the claims can be also used.

INDUSTRIAL APPLICABILITY

The present invention can be effectively utilized for the sliding bearing that slides while receiving a load, and the mechanic structure including the sliding bearing.

The invention claimed is:

1. A carbon material for bearings including:
a porous carbon base material acquired by firing after formation of a mixture including carbon powder and a binder; and
an impregnation material with which the porous carbon base material is impregnated, and made of resin or metal, wherein
the carbon material for bearings has Shore hardness of not more than 82 HS, and
a cumulative pore volume of pores having a diameter larger than 0.1 μm is not more than 4 mm³/g in a pore distribution measured by a mercury penetration method.

2. The carbon material for bearings according to claim 1, wherein bulk density of the carbon base material is not less than 1.7 Mg/m³.

3. The carbon material for bearings according to claim 1, wherein bulk density of the carbon base material is not more than 1.8 Mg/m³.

4. A sliding member used for a sliding bearing is formed of the carbon material for bearings according to claim 1.

* * * * *